United States Patent
Arai et al.

(10) Patent No.: US 7,595,235 B2
(45) Date of Patent: Sep. 29, 2009

(54) SOLID ELECTROLYTIC CAPACITOR, TRANSMISSION-LINE DEVICE, METHOD OF PRODUCING THE SAME, AND COMPOSITE ELECTRONIC COMPONENT USING THE SAME

(75) Inventors: Satoshi Arai, Sendai (JP); Sadamu Toita, Sendai (JP); Yoshihiko Saiki, Sendai (JP); Naoki Wako, Sendai (JP); Masahiko Takahashi, Sendai (JP)

(73) Assignee: NEC Tokin Corporation, Sendai-shi (JP)

( * ) Notice: Subject to any disclaimer, the term of this patent is extended or adjusted under 35 U.S.C. 154(b) by 376 days.

(21) Appl. No.: 11/337,315

(22) Filed: Jan. 23, 2006

(65) Prior Publication Data

US 2006/0130301 A1 Jun. 22, 2006

Related U.S. Application Data

(62) Division of application No. 11/062,006, filed on Feb. 18, 2005, now Pat. No. 7,009,834.

(30) Foreign Application Priority Data

Feb. 20, 2004 (JP) ............................... 2004-44303
Mar. 31, 2004 (JP) .............................. 2004-102436

(51) Int. Cl.
*H01L 21/8238* (2006.01)
(52) U.S. Cl. ............................... 438/215; 257/E21.536; 29/25.03
(58) Field of Classification Search ......... 361/532–538; 257/615–625, E21.536; 29/25.03; 438/123, 438/215, 240
See application file for complete search history.

(56) References Cited

U.S. PATENT DOCUMENTS

| | | | |
|---|---|---|---|
| 6,510,045 B2 | 1/2003 | Mido et al. | |
| 6,836,401 B2 | 12/2004 | Yoshida et al. | |
| 6,914,322 B2 | 7/2005 | Iijima et al. | |
| 6,917,514 B2 | 7/2005 | Mido et al. | |
| 7,126,811 B2 * | 10/2006 | Hirano et al. | 361/523 |

(Continued)

FOREIGN PATENT DOCUMENTS

CN 1428800 A 7/2003

(Continued)

OTHER PUBLICATIONS

Japanese Office Action dated Jun. 18, 2008 issued in counterpart JP Appln. No. 2004-044303.

(Continued)

*Primary Examiner*—Nathan W Ha
(74) *Attorney, Agent, or Firm*—Frishauf, Holtz, Goodman & Chick, P.C.

(57) ABSTRACT

A solid electrolytic capacitor includes a package for a capacitor element including an anode lead portion and a cathode portion. The package includes an insulating resin member which is arranged to cover the capacitor element and which includes hole portions formed therethrough. An anode terminal of the solid electrolytic capacitor includes a metal-plating layer which is placed in the hole portion to be electrically connected to the anode lead portion through the hole portion. A cathode terminal of the solid electrolytic capacitor includes a metal-plating layer which is placed in the hole portion to be electrically connected to the cathode conducting portion through the hole portion.

8 Claims, 11 Drawing Sheets

U.S. PATENT DOCUMENTS

| | | |
|---|---|---|
| 7,335,531 B2 | 2/2008 | Iijima et al. |
| 2002/0033378 A1 | 3/2002 | Hayashi et al. |
| 2003/0122240 A1 | 7/2003 | Lin et al. |

FOREIGN PATENT DOCUMENTS

| | | |
|---|---|---|
| JP | 5-102645 A | 4/1993 |
| JP | 8-275983 A | 10/1996 |
| JP | 10-125558 A | 5/1998 |
| JP | 10-289838 A | 10/1998 |
| JP | 11-204372 A | 7/1999 |
| JP | 2001-102252 A | 4/2001 |
| JP | 2001-307946 A | 11/2001 |
| JP | 2002-134359 A | 5/2002 |
| JP | 2002-237431 A | 8/2002 |
| JP | 2002-260967 A | 9/2002 |
| JP | 2003-045762 A | 2/2003 |
| JP | 2003-133176 A | 5/2003 |
| JP | 2003-142335 A | 5/2003 |
| JP | 2003-158042 A | 5/2003 |
| JP | 2003-168627 A | 6/2003 |
| JP | 2003-249418 A | 9/2003 |
| JP | 2003-274642 A | 9/2003 |
| JP | 2004-055794 A | 2/2004 |
| JP | 2004-104048 A | 4/2004 |

OTHER PUBLICATIONS

Chinese Office Action dated Aug. 29, 2008 issued in counterpart Chinese Appln. No. 2005100094620.

* cited by examiner

SOLID ELECTROLYTIC CAPACITOR, TRANSMISSION-LINE DEVICE, METHOD OF PRODUCING THE SAME, AND COMPOSITE ELECTRONIC COMPONENT USING THE SAME

The present application is a divisional application of U.S. application Ser. No. 11/062,006, filed Feb. 18, 2005 now U.S. Pat. No. 7,009,834 which claims the priority of Japanese applications Nos. JP 2004-044303 and JP 2004-102436, the disclosures of which are incorporated herein by reference.

BACKGROUND OF THE INVENTION

The present invention relates to a thin type solid electrolytic capacitor, a thin type transmission-line device, a composite electronic component integrating the capacitor or the transmission-line device with a semiconductor chip, and a method of producing the same.

Miniaturization, slimming, and sophistication in electronic devices have been progressing. These features are remarkable in portable devices. With this trend, electronic components mounted in these devices are increasingly required to be miniaturized, slimmed, and sophisticated.

In these circumstances, miniaturization and slimming not only in semiconductor components but also in passive components, especially in solid electrolytic capacitors and transmission-line devices, which are used for decoupling a power supply circuit, have also been increasingly demanded.

In this trend, miniaturization is also under way in a composite component which combines a semiconductor component with these passive components. In particular, since a solid electrolytic capacitor and a transmission-line device have a high capacitance as compared with that of a ceramic capacitor and the like, an excellent decoupling effect can be expected when they are combined with a semiconductor chip.

Conventionally, a surface-mounted type solid electrolytic capacitor is generally covered with mold resin package. FIG. 1 illustrates a sectional view of such a conventional resin-molded type solid electrolytic capacitor.

Referring to FIG. 1, a resin-molded type solid electrolytic capacitor 701 is composed of an anode body 1 which is a plate or foil of a valve action metal such as aluminum, niobium, tantalum, or alloys thereof serving as a base metal. The surface of the base metal is enlarged, and the enlarged surface of the base metal is covered by a dielectric layer, consisting of an oxide of the base metal. The capacitor also comprises a resist layer 2 which defines two sections, and a cathode conducting layer 3 which covers a major portion of the anode body 1. The capacitor further includes an anode terminal 71 which is firmly fixed to the portion of the anode body 1 which is not covered with the cathode conducting layer 3, a cathode terminal 81 which is firmly fixed to the cathode conducting layer 3, and a mold resin package 91. However, the capacitor is not thin enough due to the thickness of the mold resin necessary for molding.

Another structure for slimming solid electrolytic capacitors is disclosed in Japanese Patent laid-open No. 2003-249418. FIG. 2 shows a sectional view of a conventional thin solid electrolytic capacitor disclosed in it.

Referring to FIG. 2, a thin solid electrolytic capacitor 702 comprises an anode terminal 72 fixed to an anode body 1, a cathode terminal 82 fixed to a cathode conducting layer 3, a metal plate 92 covering the cathode conducting layer 3, and an insulating part 93 covered with the metal plate 92. The whole thickness can be reduced as the mold resin package is removed. However, further thinning is difficult because of the thickness of the metal plate necessary for handling.

To attain miniaturization of a composite electronic component built with a semiconductor component, a solid electrolytic capacitor is required to be reduced to a thickness of, for example, not more than 0.3 mm, which is as thin as that of a semiconductor chip.

SUMMARY OF THE INVENTION

An object of the present invention is to provide a solid electrolytic capacitor and a transmission-line device that are further slimmed, and a method of manufacturing the same.

Another object of the present invention is to provide a slimmed composite electronic component, wherein the solid electrolytic capacitor or the transmission-line device is combined with a semiconductor chip.

According to the present invention, there is provided a solid electrolytic capacitor comprising a solid electrolytic capacitor element, a package covering the element, and anode and cathode terminals for electrically connecting to an object. The solid electrolytic capacitor element comprises an anode member which is made of a valve action metal and extends in a longitudinal direction of the element, the anode member being provided with an anode portion and an anode lead portion, a dielectric layer made of a metal oxide of the valve action metal and formed on a surface of the anode portion, and a cathode member comprising a cathode conducting portion formed on a surface of the dielectric layer. The package comprises an insulating resin member which is arranged to cover the element. The insulating resin member has hole portions formed therethrough. The anode terminal comprises a metal-plating layer which is placed in the hole portion. The anode terminal is electrically connected to the anode lead portion through the hole portion. The cathode terminal comprises a metal-plating layer which is placed in the hole portion. The cathode terminal is electrically connecting to the cathode conducting portion through the hole portion. The valve action metal may be aluminum, niobium, tantalum, or alloys thereof.

The anode terminal and the cathode terminal may comprise an extension area protruding from the surface of the insulating resin member and electrically connected to the metal-plating layer in the hole portions. The extension area may comprise a metal plating layer formed on the surface of the insulating resin member. The extension area may comprise a solder ball bordered by the metal-plating layer in the hole portions. The extension area may comprise a metal foil formed on the surface of the insulating resin member.

The solid electrolytic capacitor may comprises an additional anode terminal electrically connected to a different location of the anode lead portion. The capacitor may comprises an additional cathode terminal electrically connected to a different location of the cathode conducting layer. The anode terminal, the additional anode terminal, the cathode terminal, and the additional cathode terminal may be arranged on both sides of the insulating resin member. The anode terminal, the additional anode terminal, the cathode terminal, and the additional cathode terminal may be arranged on one side of the insulating resin member.

The insulating resin member may comprise resin sheets to sandwich the element therebetween. The resin sheets may be hot-pressed or glued to each other by adhesive. The insulating resin member may comprise a resin covering which is formed by impregnating the element with epoxy resin liquid.

According to the present invention, there is provided a transmission-line type capacitor device comprising a transmission-line type solid electrolytic capacitor element, a package covering the element, and anode terminals and cathode terminal for electrically connecting to an object. The transmission-line type solid electrolytic capacitor element comprises an anode member which is made of a valve action metal and extends in a longitudinal direction of the element and which is provided with a first anode lead portion, an anode portion, and a second anode lead portion in this order, a dielectric layer made of a metal oxide of the valve action metal and formed on a surface of the anode portion, and a cathode member comprising a cathode conducting portion formed on a surface of the dielectric layer. The package comprises an insulating resin member which is arranged to cover the element The insulating resin member has hole portions formed therethrough. The anode terminals comprise a metal-plating layers which are placed in the hole portion. The anode terminals are electrically connected to the first and the second anode lead portions through the hole portions. The cathode terminal comprises a metal-plating layer which is placed in the hole portion. The cathode terminals is electrically connecting to the cathode conducting portion through the hole portion.

According to the present invention, there is provided a composite electronic component comprising a semiconductor chip, and a solid electrolytic capacitor which comprises a solid electrolytic capacitor element, a package covering the element, and anode and cathode terminals for electrically connecting to the semiconductor chip. The solid electrolytic capacitor element comprises an anode member which is made of a valve action metal and extends in a longitudinal direction of the element and which is provided with an anode portion and an anode lead portion, a dielectric layer made of a metal oxide of the valve action metal and formed on a surface of the anode portion, a cathode member comprising a cathode conducting portion formed on a surface of the dielectric layer. The package comprises an insulating resin member which is arranged to cover the element, the insulating resin member having hole portions formed therethrough. The anode terminal comprises a metal-plating layer which is placed in the hole portion. The anode terminal is electrically connected to the anode lead portion through the hole portion. The cathode terminal comprises a metal-plating layer which is placed in the hole portion. The cathode terminal is electrically connecting to the cathode conducting portion through the hole portion. The semiconductor chip is mounted on the solid electrolytic capacitor.

According to the present invention, there is provided a composite electronic component comprising a semiconductor chip, and a transmission-line type solid electrolytic capacitor which comprises a transmission-line type solid electrolytic capacitor element, a package covering the element, and anode terminals and a cathode terminal for electrically connecting to the semiconductor chip. The transmission-line type solid electrolytic capacitor element comprises an anode member which is made of a valve action metal and extends in a longitudinal direction of the element and which is provided with an first anode lead portion, an anode portion and a second anode lead portion in th is order, a dielectric layer made of a metal oxide of the valve action metal and formed on a surface of the anode portion, and a cathode member comprising a cathode conducting portion formed on a surface of the dielectric layer. The package comprises an insulating resin member which is arranged to cover the element. The insulating resin member has hole portions formed therethrough. The anode terminals comprises a metal-plating layer which is placed in the hole portions. The anode terminals are electrically connected to the first and the anode lead portions through the hole portions. The cathode terminal comprises a metal-plating layer which is placed in the hole portions. The cathode terminal are electrically connecting to the cathode conducting portion through the hole portions. The semiconductor chip is mounted on the transmission-line type solid electrolytic capacitor device.

According to the present invention, there is provided a method of fabricating a solid electrolytic capacitor comprising a solid electrolytic capacitor element, a package covering the element, and anode and cathode terminals for electrically connecting to an object. The solid electrolytic capacitor element comprises an anode member which is made of a valve action metal and extends in a longitudinal direction of the element and which is provided with an anode portion and an anode lead portion, a dielectric layer made of a metal oxide of the valve action metal and formed on a surface of the anode portion, a cathode member comprising a cathode conducting portion formed on a surface of the dielectric layer, and a cathode member comprising a cathode conducting portion formed on a surface of the dielectric layer. The method comprises steps of: preparing the solid electrolytic capacitor element, applying an insulating resin member to cover the element, forming hole portions in the insulating resin member, and placing a metal-plating layer in the hole portions to provide the anode terminal and the cathode terminal.

According to the present invention, there is provided a method of fabricating a transmission-line type capacitor device comprising a transmission-line type solid electrolytic capacitor element, a package covering the element, and anode terminals and cathode terminal for electrically connecting to an object. The transmission-line type solid electrolytic capacitor element comprises an anode member which is made of a valve action metal and extends in a longitudinal direction of the element, in which the anode member is provided with a first anode lead portion, an anode portion, and a second anode lead portion in this order, a dielectric layer made of a metal oxide of the valve action metal and formed on a surface of the anode portion, and a cathode member comprising a cathode conducting portion formed on a surface of the dielectric layer. The method comprises steps of: preparing the transmission-line type solid electrolytic capacitor element, applying an insulating resin member to cover the element, forming hole portions in the insulating resin member, and placing a metal-plating layer in the hole portions to provide the anode terminals and the cathode terminal.

In accordance with the present invention, a solid electrolytic capacitor and a transmission-line device can be slimmed and miniaturized because a package and anode and cathode terminals of the capacitor and the transmission-line device are very thinned.

Moreover, a composite electronic component built with a semiconductor chip can be very slim and small using a solid electrolytic capacitor or a transmission-line device of the present invention. In addition, the composite electronic component dispenses with an external capacitor component.

Further, a solid electrolytic capacitor of the present invention enables a high-speed operation of utility circuits. This is because a plurality of anode terminals and cathode terminals can be easily formed in the solid electrolytic capacitor and the transmission-line device, and the utility circuits can use appropriate anode and cathode terminals located in close vicinity to terminals of the utility circuits. The availability of a plurality of anode and cathode terminals serves to reduce an inductance in over all circuits.

Thus, the present invention contributes to a miniaturization of electronic devices.

BRIEF DESCRIPTION OF THE DRAWINGS

A more complete understanding of the invention may be obtained from a consideration of the following description in conjunction with the drawings in which.

DESCRIPTION OF THE PREFERRED EMBODIMENT

First Embodiment

Figure 1:
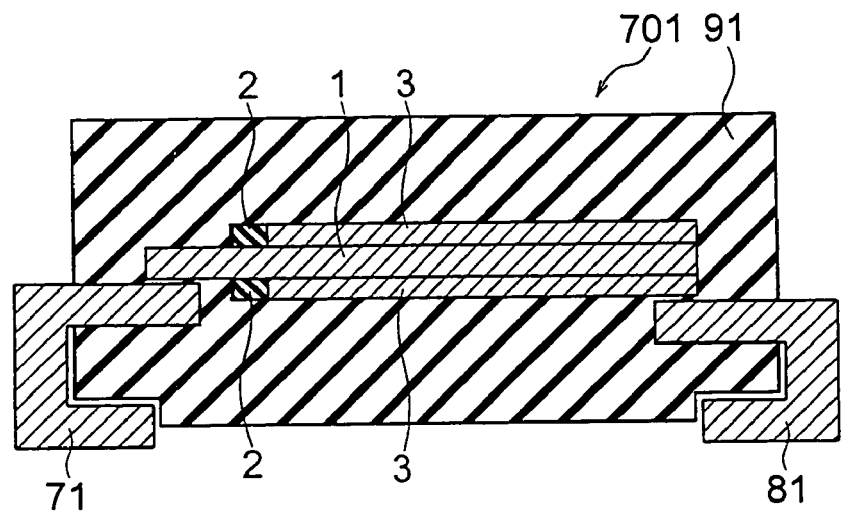
FIG. 1 is a sectional view of an example of a conventional resin-molded type solid electrolytic capacitor.
Figure 2:
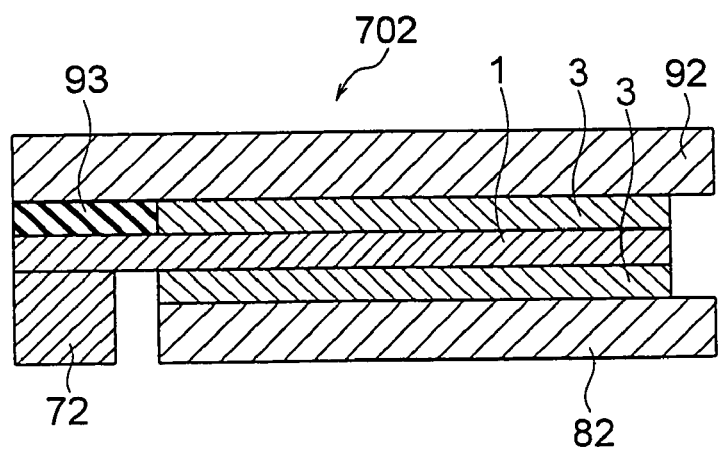
FIG. 2 is a sectional view of another example of a conventional thin solid electrolytic capacitor.
Figure 3A:
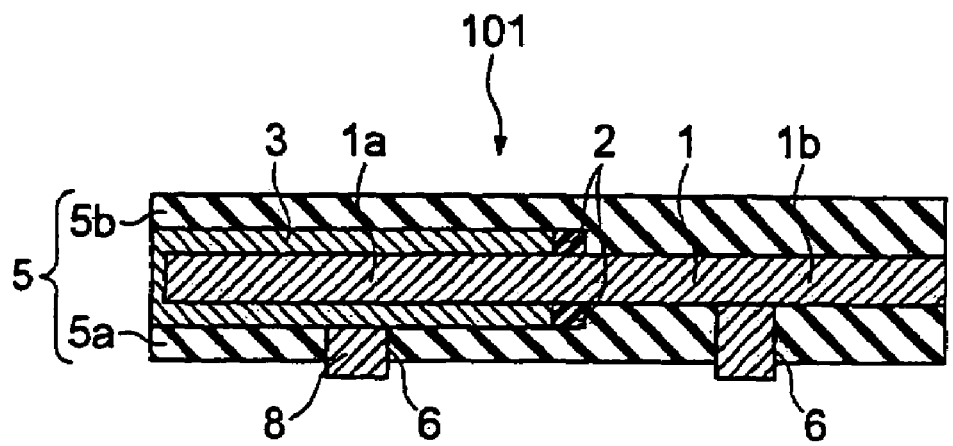
FIGS. 3A and 3B are a sectional view and a bottom plan view of a solid electrolytic capacitor according to a first of the present invention.
Figure 3B:
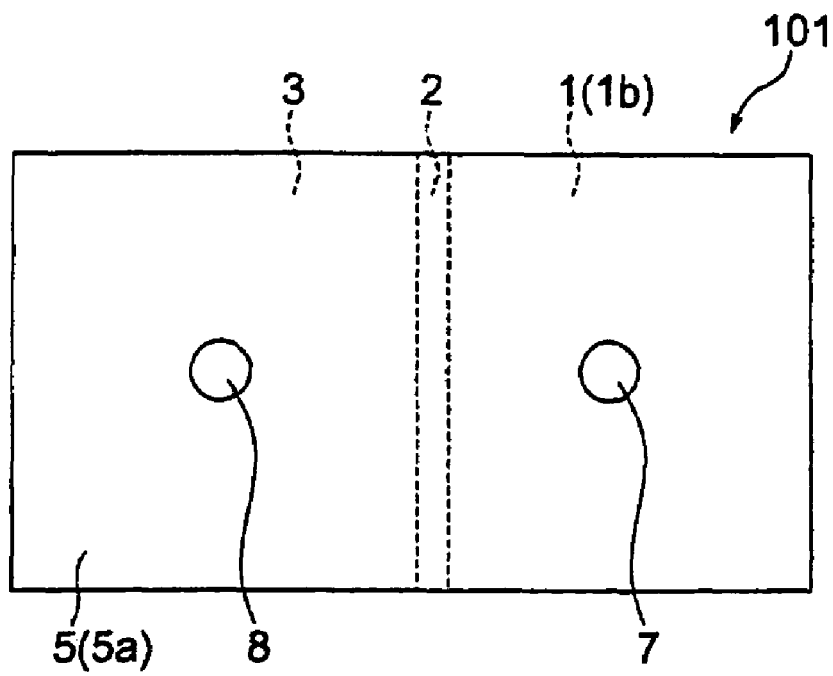

Referring to FIGS. 3A and 3B, a solid electrolytic capacitor 101 according to a first embodiment of the present invention comprises an anode body 1 which comprises a plate or foil made of valve action metal such as aluminum, niobium, tantalum, or alloys thereof as a base metal. The surface of the anode body 1 is enlarged, and is divided into two sections by a resist layer 2. The anode body 1 includes an anode portion 1a located in one section and an anode lead portion 1b located in the other section. A surface of the anode portion 1a is covered with a dielectric layer (not shown) made of an oxide of the base metal. A surface of the dielectric layer is covered with a cathode conducting layer 3. The cathode conducting layer 3 is composed of solid electrolyte, graphite, and silver paste. Those make up a basic structure of a solid electrolytic capacitor element.

The solid electrolytic capacitor element is sandwiched by a package 5 including lower and upper sheets 5a and 5b from lower and upper sides of the capacitor element. For example, each of the lower and the upper sheets 5a and 5b is several tens of micrometers in thickness. The thickness of the package 5 is not more than 0.3 mm.

The lower sheet 5a has two hole portions 6 that reach the anode body 1 and the cathode conducting layer 3, respectively. The hole portions 6 are formed by a process capable of forming a hole in the resin member such as a laser process. In the hole portion 6 which reaches the anode body 1, an anode terminal 7 is constituted by forming a metal plating layer in the hole portion 6. Also, in the hole portion 6 which reaches the cathode conducting layer 3, a cathode terminal 8 is constituted by forming a metal plating layer in the hole portion 6. The metal plating layers slightly protrude from a surface of the package 5. The metal plating layer is made of high electrical-conductive metal such as copper. For example, the metal plating layer protruding from the package 5 is several micrometers to several tens of micrometers in thickness. The anode terminal 7 and the cathode terminal 8 provide electrical connections to an object to which the capacitor element is to be electrically connected.

Although, in the above embodiment, no metal plating layer is formed on a surface of the anode body 1 in the other section, or on a surface of the anode lead portion 1b, it is preferable that a metal plating layer is formed on the surface of the anode lead portion Ib. This is because of preventing the surface of the anode lead portion Ib from being damaged by the process in forming the hole portion 6 in the package 5. A metal foil may be formed with the use of electrical-conductive adhesive on the surface of the anode lead portion Ib, instead of the metal plating layer.

On the same account, it is also preferable that a metal plating layer or a metal foil is formed on the surface of the cathode conducting layer 3.

Next, a method of producing the solid electrolytic capacitor 101 will be explained.

Figure 11:
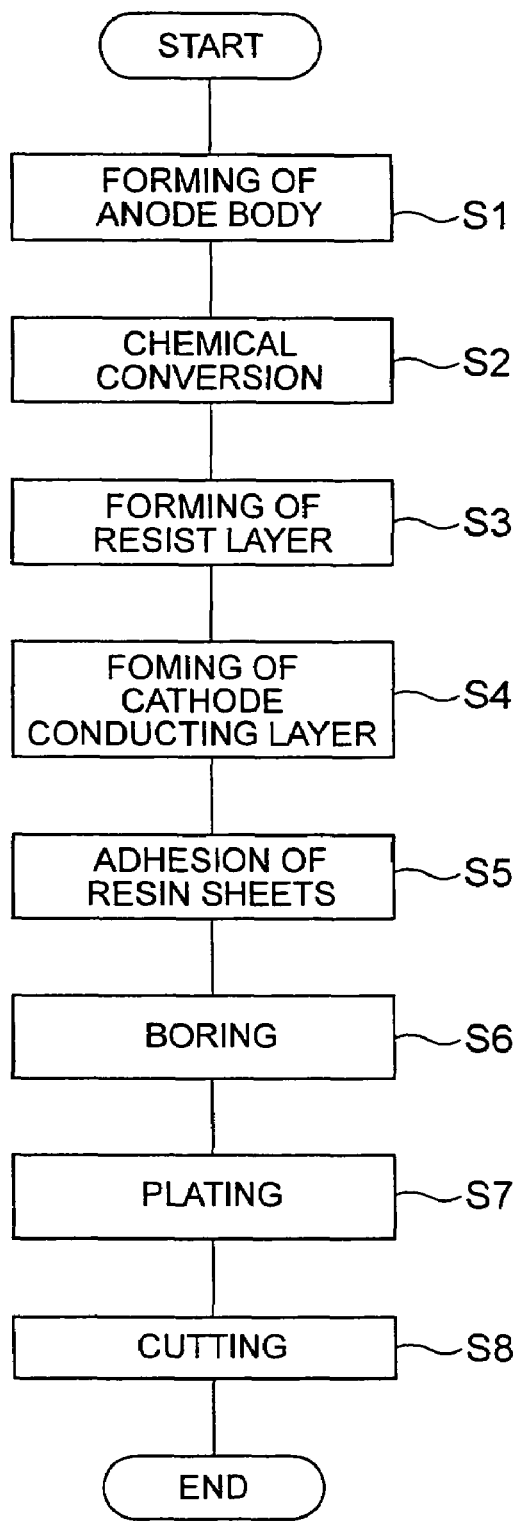
FIG. 11 is a flowchart of a production process showing a method of producing a solid electrolytic capacitor of the present invention.

With reference to FIG. 11, a preparation is made of an anode body constituted by a plate or foil which is made of valve action metal such as aluminum, niobium, tantalum, or alloys thereof, the surface of which is enlarged (Step S1). Surface enlargement may be made by either etching the plate or foil, or sintering valve action metal powders with a valve action metal plate to be combined. The plate or the foil includes a plurality of anode bodies each of which can be cut-out from the plate or the foil.

Then, a dielectric layer consisting of an oxide of the base metal is formed on the surface of the plate or foil by chemical conversion processing (Step S2). These processes make up the anode body having the dielectric layer formed on the plate or foil.

Next, a resist layer 2 is applied and formed in a predetermined section of the surface of the anode body (Step S3) and the cathode conducting layer 3 which is made of solid electrolyte, is formed in a predetermined section for a cathode (Step S4). The solid electrolyte can be obtained by applying known processes to manganese dioxide or conductive polymers such as polypyrrole, polythiophene, polyaniline, or complexes thereof. Furthermore, a graphite layer, a silver paste layer, for example, may be formed on the surface of the solid electrolyte. Then, a part of the dielectric layer is removed to provide an anode lead portion 1b.

Preferably, the outermost layer of the cathode conducting layer 3 has a metal plated or a metal-foil adhered with a conductive adhesive, thereby to reducing damages by post processing, for example, laser processing. The outermost layer of the anode lead portion Ib is also preferred to have a metal plated or a metal-foil welded for the same reason.

Then, a capacitor element produced by the above processes is covered by the package 5 consisting of the lower and the upper sheets 5a and 5b from the top and bottom of the element (Step S5). The package 5 is produced by curing of partially cured epoxy resin sheets such as a prepreg by heat pressing. Alternatively, the package 5 may be produced by applying an adhesive to the capacitor element and sandwiching them by resin sheets.

Furthermore, two hole portions, 6 are so formed in the package 5 by laser processing that they have a depth enough to reach the anode lead portion Ib and the cathode conducting layer 3. The hole portions 6 and the predetermined portions of the package 5 are plated (Step S7) to provide the anode terminal 7 and the cathode terminal 8. Finally, cutting (step S8) is performed in predetermined positions to form individual components.

Figure 4:
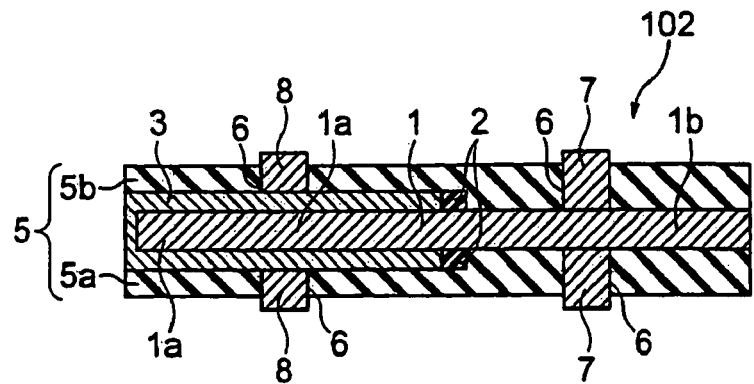
FIG. 4 is a sectional view of a solid electrolytic capacitor according to a variation of the first embodiment of the present invention.

Referring to FIG. 4, a solid electrolytic capacitor 102 as a variation of the first embodiment of the present invention differs from the first embodiment of FIGS. 3A and 3B in that the capacitor has a plurality of terminals on the lower and the upper sides of the solid electrolytic capacitor element. Therefore, the same elements will be denoted by like reference numerals and omitted in detailed description, and the description will be made mainly of different elements.

The lower sheet 5a and the upper sheet 5b of the package 5 have two hole portions 6 that respectively reach the anode body 1 and the cathode conducting layer 3, respectively. In the hole portions 6 which reach the anode body 1, anode terminals 7 are constituted by forming a metal plating layer in the hole portions 6. Also, in the hole portions 6 which reach the cathode conducting layer 3, cathode terminals 8 are constituted by forming a metal plating layer in the hole portions 6. The metal plating layers slightly protrude from the surface of the package 5. The metal plating layers are made of high electrical-conductive metal such as copper.

Figure 5A:
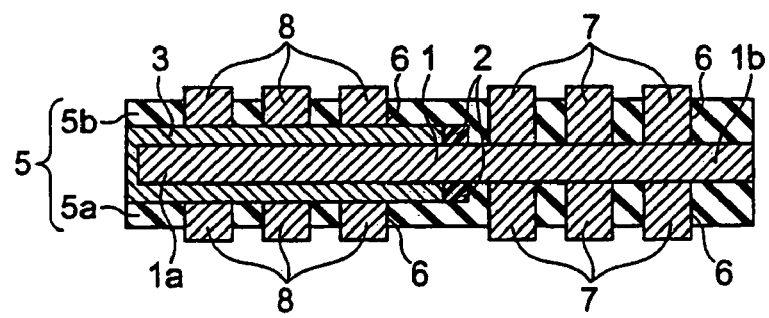
FIGS. 5A and 5B are a sectional view and a bottom plan view of a solid electrolytic capacitor according to another variation of the first embodiment of the present invention.
Figure 5B:
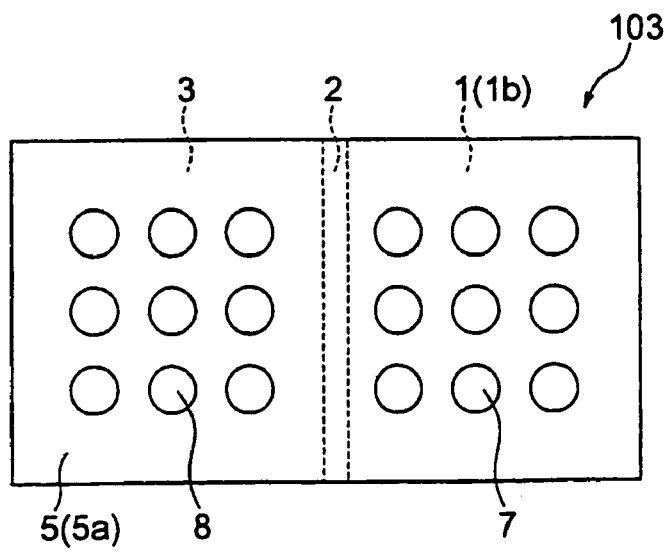

Referring to FIGS. 5A and 5B, a solid electrolytic capacitor 103 as another variation of the first embodiment of the present invention comprises the same elements as those of the solid electrolytic capacitor of the variation of the first embodiment shown in FIG. 4. A main difference between the variation and the other variation of the first embodiment lies in the number of the terminal. An explanation will be made of the difference.

The lower sheet 5a and the upper sheet 5b of the package 5 have eighteen hole portions 6 that respectively reach the anode body 1 and the cathode conducting layer 3, respectively. In the hole portions 6 which reach the anode body 1, anode terminals 7 are constituted by forming a metal plating layer in the hole portions 6. Also, in the hole portions 6 which reach the cathode conducting layer 3, cathode terminals 8 are constituted by forming a metal plating layer in the hole portions 6. The metal plating layers slightly protrude from the surface of the package 5. The metal plating layers are made of high electrical-conductive metal such as copper. As apparent from FIG. 5B, the anode terminals 7 are arranged, along each of lines parallel and perpendicular to a longitudinal direction of the capacitor element, on a lower surface of the anode lead portion 1b.

Second Embodiment

Figure 6A:
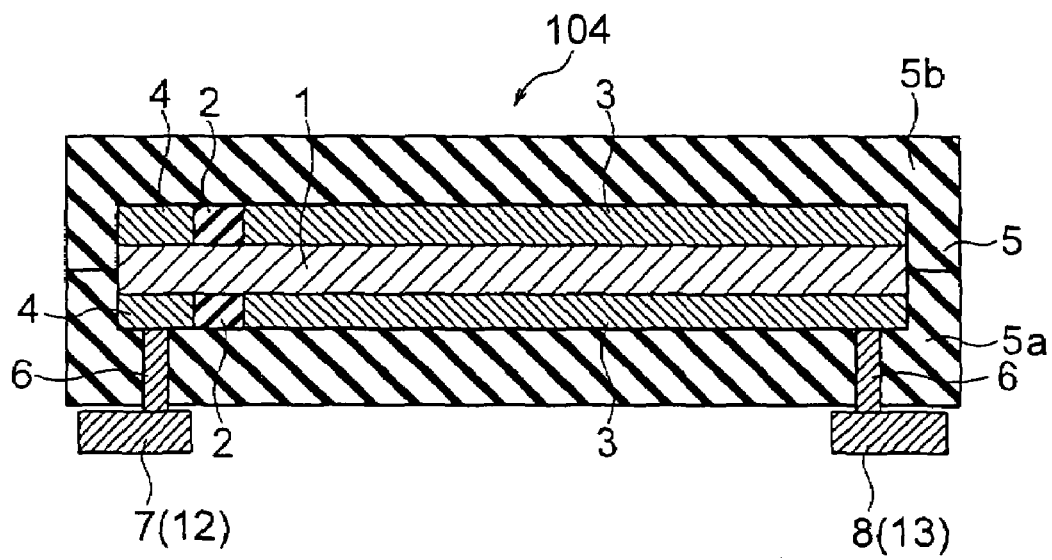
FIGS. 6A and 6B are a sectional view and a bottom plan view of a solid electrolytic capacitor according to a second embodiment of the present invention.

Referring to FIG. 6A, a solid electrolytic capacitor 104 according to a second embodiment of the present invention mainly differs from the first embodiment of FIGS. 3A and 3B in that anode terminal 7 and cathode terminal 8 have extension areas 12 and 13, respectively. Therefore, the same elements will be denoted by like reference numerals and omitted in detailed description, and the description will be made mainly of different elements.

Figure 6B:
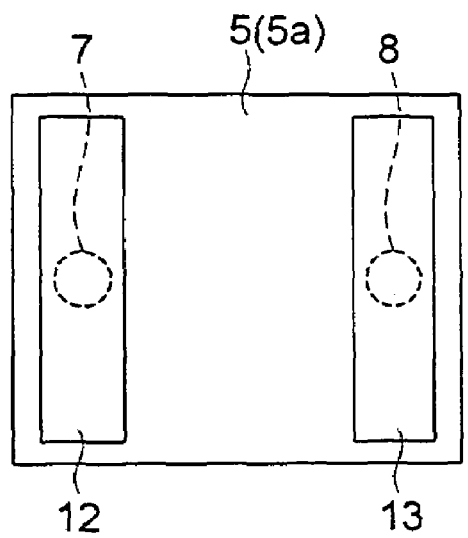

Referring to FIG. 6B together with FIG. 6A, the capacitor 104 further comprises a metal plating layer 4 formed on the surface of the anode lead portion 1b. The anode terminal 7 and the cathode terminal 8 are respectively constituted by forming a metal plating layer in the hole portions 6 and on parts of the surface of the package 5 to provide electrical connections with the metal plating layer 4 and the cathode conducting layer 3. Areas 12 and 13 of the metal plating layer on parts of the surface of the package 5 constitute extension areas of the anode and the cathode terminals 7 and 8.

The extension areas 12 and 13 slightly protrude from the surface of the package 5. For example, the metal plating layer protruding from the package 5 is several micrometers to several tens of micrometers in thickness. The extension areas 12 and 13 serve to connect the anode and the cathode terminals 7 and 8 to an object to which the capacitor element is to be electrically connected.

Figure 7:
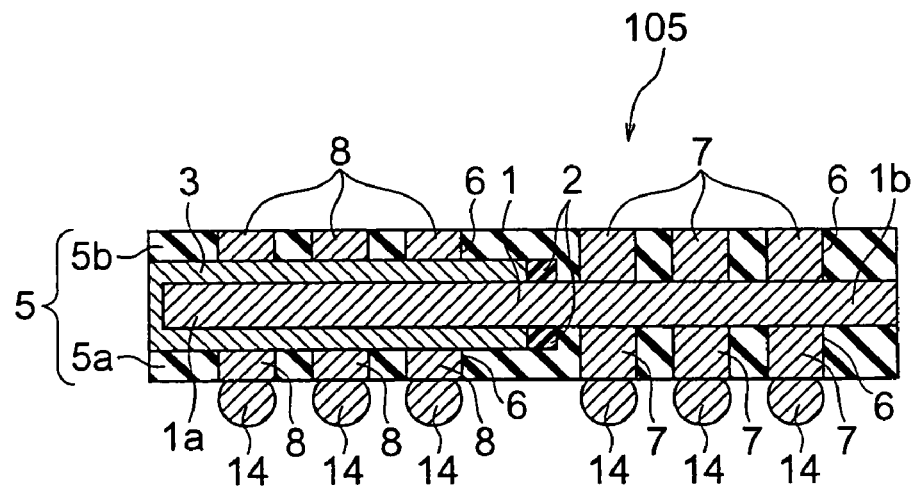
FIG. 7 is a sectional view of a solid electrolytic capacitor according to a variation of the second embodiment of the present invention.

Referring to FIG. 7, a solid electrolytic capacitor 105 as a variation of the second embodiment of the present invention mainly differs from the second embodiment of FIGS. 6A and 6B in that an anode terminal and a cathode terminal have solder balls 14 as extension areas instead of the metal plating layers, respectively. Therefore, the same elements will be denoted by like reference numerals and omitted in detailed description, and the description will be made mainly of different elements.

The solder ball 14 is made of high electrical-conductive metal and formed by a soldering process. For example, the solder ball 14 protrudes from the package 5 by several hundreds of micrometers in thickness or height. The solder balls 14 serve to easily connect the anode terminal 7 and the cathode terminal 8 to an object to which the capacitor element is to be electrically connected. This structure is called a BGA (Ball Grid Array) structure.

Figure 8:
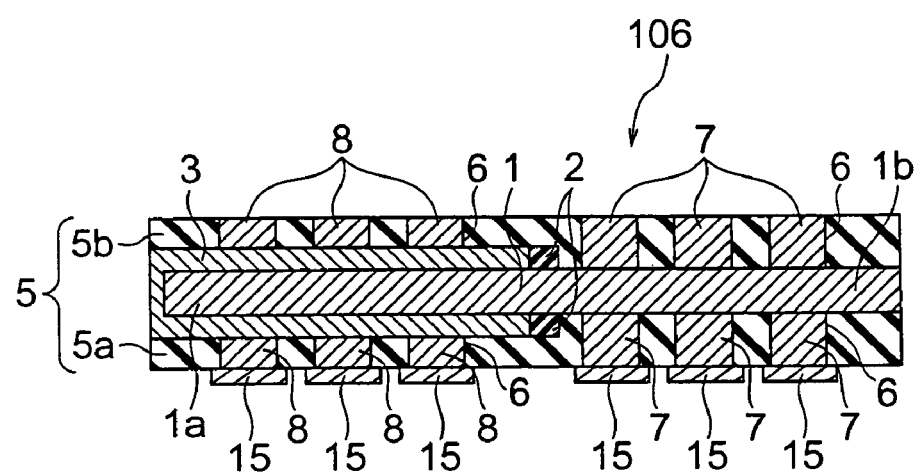
FIG. 8 is a sectional view of a solid electrolytic capacitor according to another variation of the second embodiment of the present invention.

Referring to FIG. 8, a solid electrolytic capacitor 106 as another variation of the second embodiment of the present invention mainly differs from the second embodiment of FIGS. 6A and 6B in that an anode terminal and a cathode terminal have metal foils 15 as extension areas instead of the metal plating layers, respectively. Therefore, the same elements will be denoted by like reference numerals and omitted in detailed description, and the description will be made mainly of different elements.

The metal foil 15 is made of high electrical-conductive metal and formed with the use of electrical-conductive adhesive. For example, the metal foil 15 protrudes from the package 5 by several tens of micrometers in thickness.

Third Embodiment

Figure 9A:
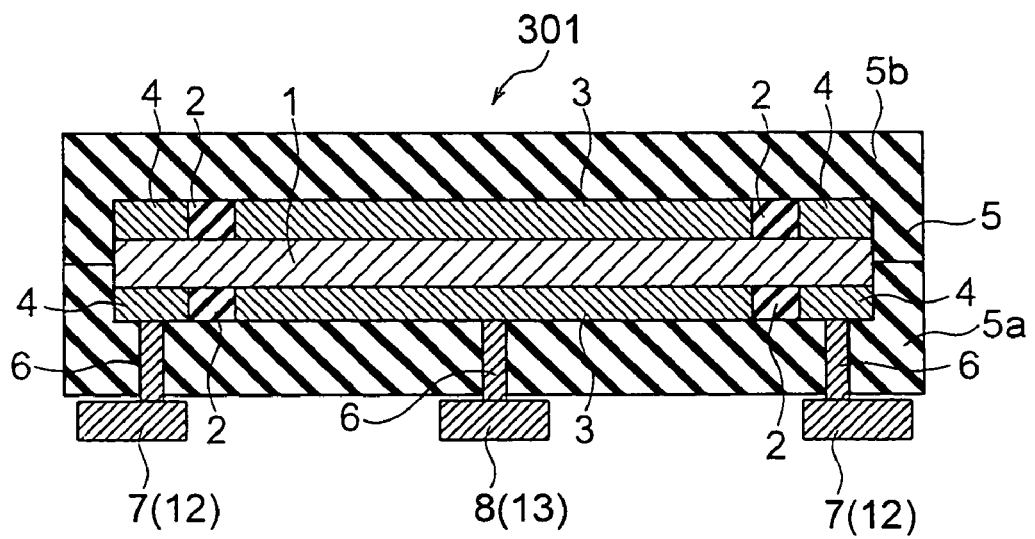
FIGS. 9A and 9B are a sectional view and a bottom plan view of a transmission-line device according to a third embodiment of the present invention.
Figure 9B:
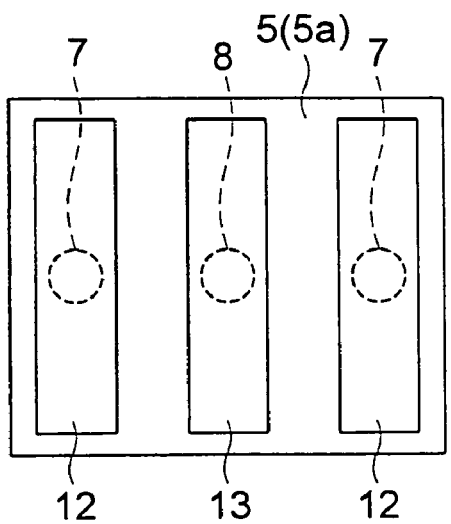

Referring to FIGS. 9A and 9B, a transmission-line device 301 according to a third embodiment of the present invention comprises an anode body 1. The transmission-line device 301 has the same structure as the solid electrolytic capacitor 104 in FIGS. 6A and 6B, except that the surface of the anode body 1 is divided into three sections by two parts of a resist layer 2. That is, a cathode conducting layer 3, which is made of solid electrolyte, graphite, silver paste, and the like, is formed in the central section, and metal plating layers 4 are formed in both end sections. Two anode terminals 7 including extension areas 12 are constituted at both ends in two places, respectively. Further, a cathode terminal 8 including an extension area 13 is constituted at the center in one place (constitution in two or more places may be possible).

The transmission-line device 301 is a two-to-one terminal constitution and has three electrode terminals; one cathode terminal 8 formed at the center and two anode terminals formed on both sides.

Thus, both the capacitor and the transmission line device are similar in structure except for the number of the anode terminal 7. The fabrication process mentioned with the reference to FIG. 11 in the first embodiment of the present invention is applicable to fabrication of the transmission-line device.

Fourth Embodiment

Figure 10A:
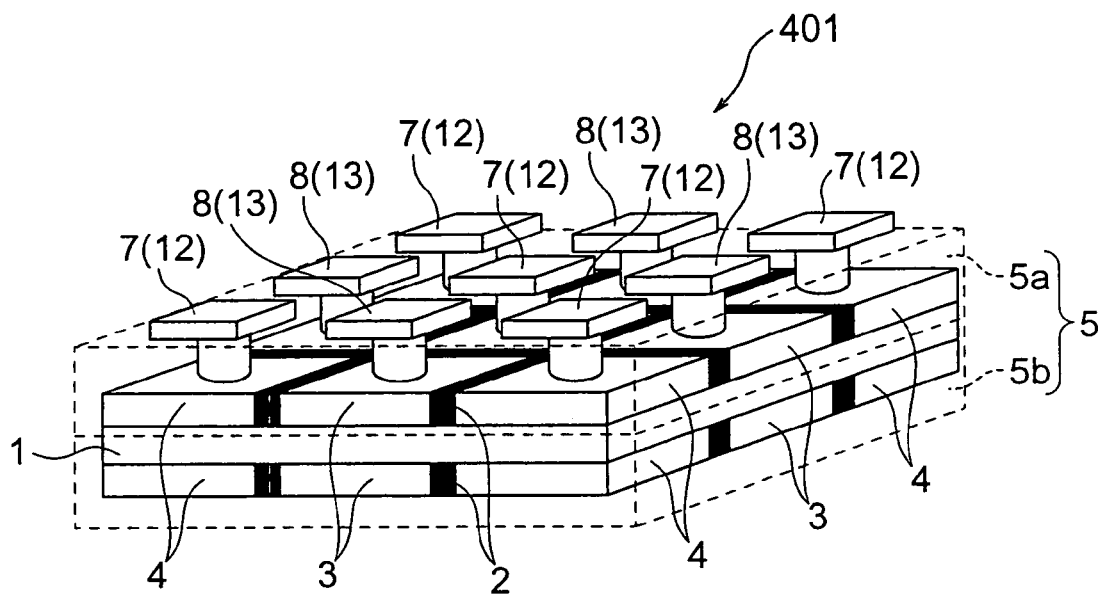
FIGS. 10A and 10B are a perspective view and a bottom plan view of a solid electrolytic capacitor according to a fourth embodiment of the present invention.
Figure 10B:
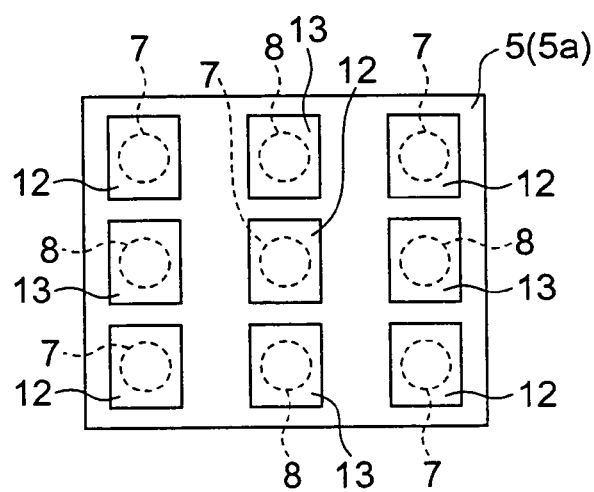

Referring to FIGS. 10A and 10B, a solid electrolytic capacitor 401 according to a fourth embodiment of the present invention has a plurality of capacitor elements, a plurality of anode terminals, and a plurality of cathode terminals.

More definitely, the capacitor 401 has a an anode body 1 which comprises a square plate or a square foil made of valve action metal. Under and upper surfaces of the anode body 1 are divided into nine sections by a resist layer 2 having a grid-shape, respectively. The divided sections include four anode portions and five anode lead portions. The anode portion and the anode lead portion are arranged alternately with each other. Each surface of the anode portions is covered with a dielectric layer (not shown) made of an oxide of the valve action metal. Each surface of the dielectric layers is covered with a cathode conducting layer 3.

Furthermore, each surface of the anode lead portions is covered with a metal plating layer 4.

The solid electrolytic capacitor element is sandwiched by a package 5 including lower and upper sheets 5a and 5b from under and upper sides of the capacitor element.

The lower sheet 5a has nine hole portions that reach the metal plating layer 4 and the cathode conducting layer 3, respectively. In the hole portion which reaches the metal plating layer 4, an anode terminal 7 is constituted by forming a metal plating layer. Also, in the hole portion which reaches the cathode conducting layer 3, a cathode terminal 8 is constituted by forming a metal plating layer. The anode terminal 7 and the cathode terminal 8 have extension areas 12 and 13, respectively.

In this structure, a solid electrolytic capacitor as well as a transmission-line device can be obtained depending on a way how to connect the cathode terminals 8 and the anode terminals 7.

Fifth Embodiment

According to the first to the fourth embodiments of the present invention, the anode terminal 7 and the cathode terminal 8 can be formed in relatively arbitrary positions since they are formed by metal plating. Thus, a distance between the anode terminal 7 and the cathode terminal 8 is reduced by forming a plurality of anode terminals 7 and cathode terminals 8, thereby reducing an inductance, and enabling a high-speed response. In addition, the BGA structure can be created by placing the solder balls 14 on the anode terminal 7 and the cathode terminal 8 if needed.

The solid electrolytic capacitor and the transmission-line device according to the present invention are advantageous as a thin surface-mounting type component.

In addition, because of the features of thin structure and high capacitance, the solid electrolytic capacitor or the transmission-line device of the present invention can provide a miniaturized composite electronic component by combining with a semiconductor chip. Hereafter, embodiments of a composite electronic component will be described.

Figure 12:
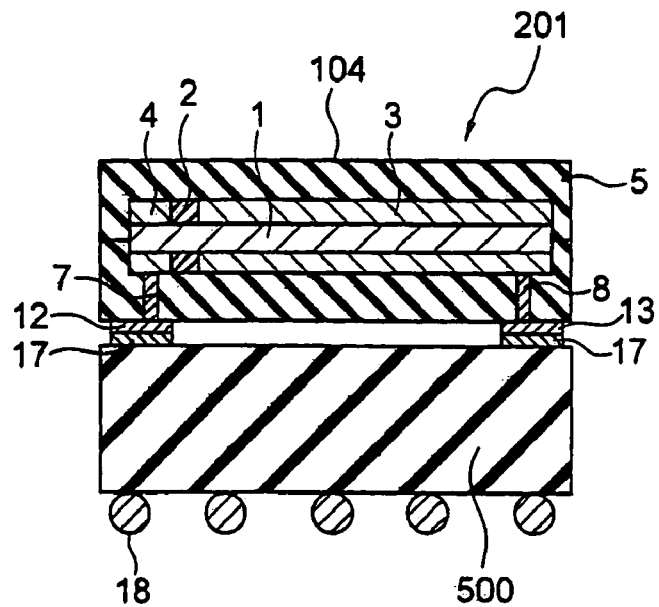
FIG. 12 is a sectional view of a composite electronic component according to a fifth embodiment of the present invention.

Referring to FIG. 12, a composite electronic component 201 according to a fifth embodiment of the present invention has a solid electrolytic capacitor such as a solid electrolytic capacitor 104 as shown in FIGS. 6A and 6B, which is placed on a semiconductor chip 500 along the thickness direction of the chip 500. Solder balls 18 are placed on the under surface of the semiconductor chip 500. The anode and the cathode terminals 7 and 8 including the extension areas 12 and 13 are electrically connected to lands (chip terminals) 17 formed on the chip 500, respectively. Alternatively, a transmission-line device such as the transmission-line device 301 as shown in FIGS. 9A and 9B may be placed instead of the solid electrolytic capacitor 104.

Sixth Embodiment

Figure 13:
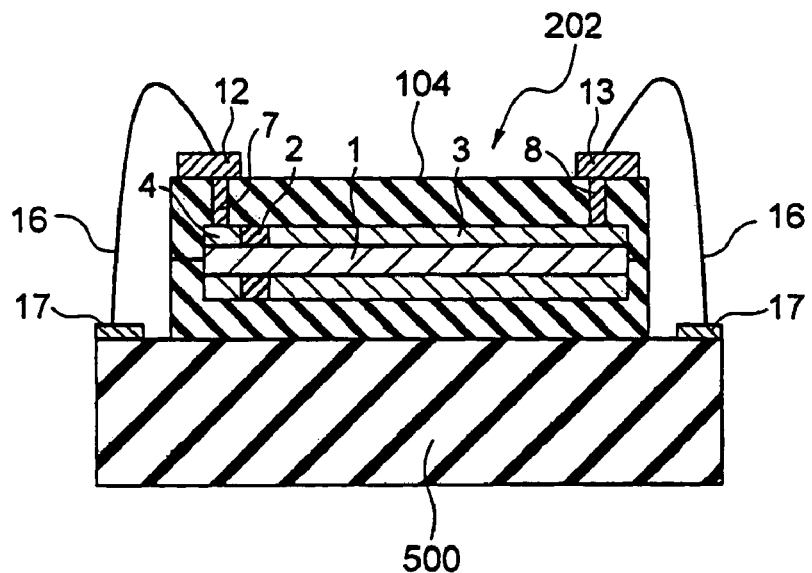
FIG. 13 is a sectional view of a composite electronic component according to a sixth embodiment of the present invention.

Referring to FIG. 13, a composite electronic component 202 according to a sixth embodiment of the present invention has such a structure that a solid electrolytic capacitor 104 as shown in FIGS. 6A and 6B is placed on the under surface of a semiconductor chip 500 along the thickness direction of the chip 500. The anode and the cathode terminals 7 and 8 including the extension areas 12 and 13 are electrically connected via bonding wires 16 to lands 17 formed on the under surface of the semiconductor chip 500, respectively. A transmission-line device 301 shown in FIGS. 9A and 9B may be placed instead of the solid electrolytic capacitor 104 as well.

Seventh Embodiment

Figure 14:
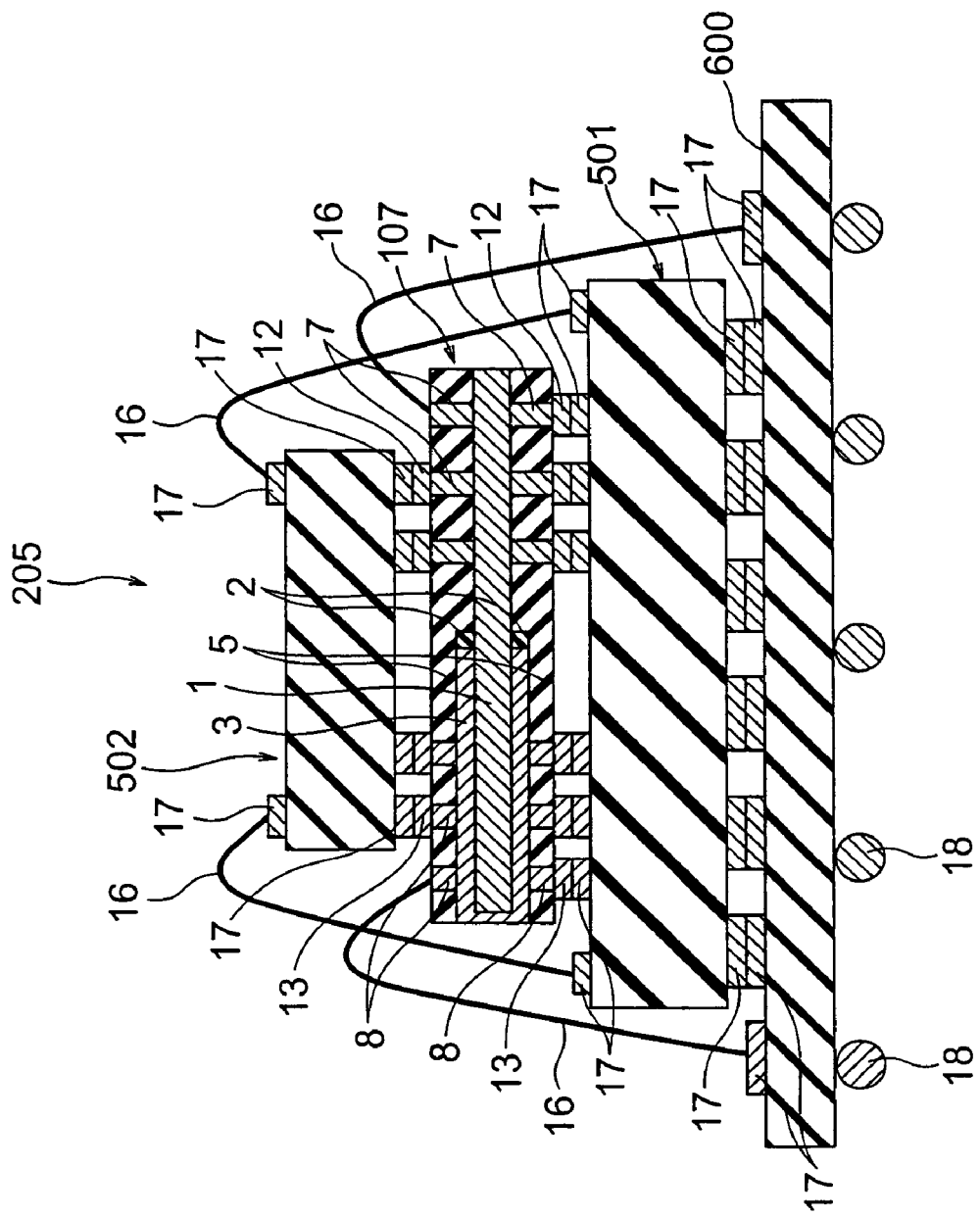
FIG. 14 is a sectional view of a composite electronic component according to a seventh embodiment of the present invention.

Referring to FIG. 14, a composite electronic component 205 according to a seventh embodiment of the present invention has an interposer or interposer board 600, a semiconductor chip 501, a solid electrolytic capacitor 107, and a semiconductor chip 502 laminated in this order.

Solder balls 18 are placed on the under side surface of the interposer 600. The semiconductor chip 501 is placed on the side of the interposer 600 along the thickness direction of the board 600.

The solid electrolytic capacitor 107 is placed on the semiconductor chip 501. The anode and cathode terminals 7 and 8 including the extension areas 12 and 13 of the solid electrolytic capacitor 107 are respectively electrically connected to lands 17 formed on the semiconductor chip 501.

The semiconductor chip 502 is placed on the solid electrolytic capacitor 107. Parts of the anode and cathode terminals 7 and 8 including the extension areas 12 and 13 of the solid electrolytic capacitor 107 are respectively electrically connected to lands 17 formed on the semiconductor chip 502. The rest of the anode and cathode terminals 7 and 8 are respectively electrically connected via bonding wires 16 to the lands 17 formed on the interposer 600.

A transmission-line device may be placed instead of the solid electrolytic capacitor 107 as well.

Eighth Embodiment

Figure 15:
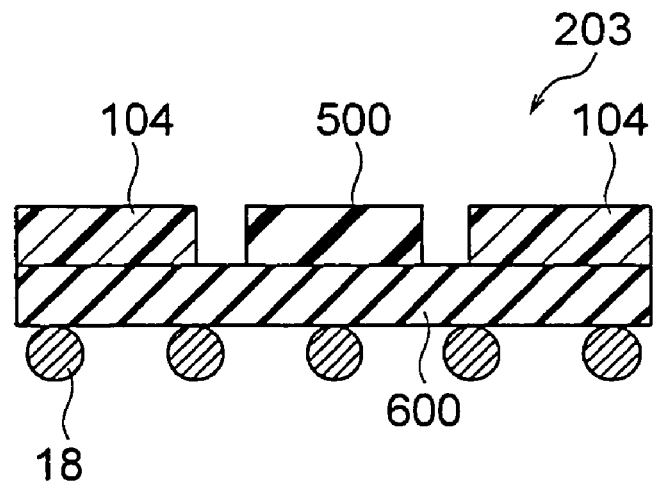
FIG. 15 is a sectional view of a composite electronic component according to a eighth embodiment of the present invention.

Referring to FIG. 15, a composite electronic component 203 according to an eighth embodiment of the present invention has a plurality of solid electrolytic capacitors 104 as shown in FIGS. 6A and 6B and a semiconductor chip 500 are placed on the same side of an interposer 600. Solder balls 18 are placed on the under side surface of the interposer 600. A plurality of the transmission-line device as shown in FIGS. 9A and 9B may be used instead of the solid electrolytic capacitor 104.

Ninth Embodiment

Figure 16:
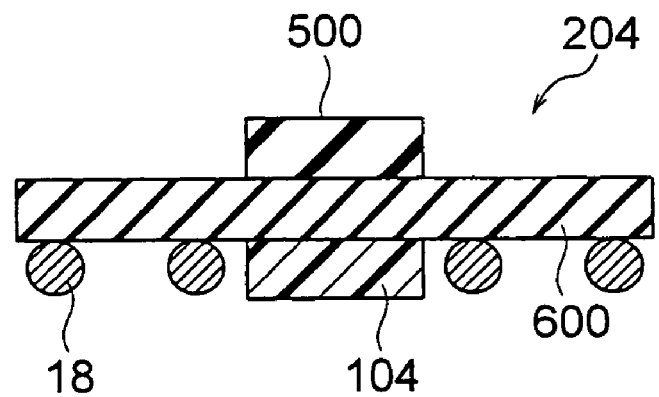
FIG. 16 is a sectional view of a composite electronic component according to a ninth embodiment of the present invention.

Referring to FIG. 16, a composite electronic component 204 according to a ninth embodiment of the present invention has a capacitor such as a capacitor 104 as shown in FIGS. 6A and 6B placed on a mounting side of an interposer 600 while the opposite side to a semiconductor chip 500. Solder balls 18 are placed on the same side of the interposer 600 as the solid electrolytic capacitor 104. A transmission-line device may be used instead of the solid electrolytic capacitor 104.

As the eighth and the ninth embodiments of the present invention, by placing a thin and high-capacitance solid electrolytic capacitor or transmission-line device in adjacent to a semiconductor chip, a decoupling effect is increased, a high-speed operation of the semiconductor can be attained, and an external passive component becomes unnecessary, thereby contributing to a miniaturization of electronic devices as well.

While this invention has thus far been described in connection with the preferred embodiments thereof, it will be readily possible for those skilled in the art to put this invention into practice in various other manners without departing from the scope set forth in the appended claims.

What is claimed is:

1. A method of fabricating a solid electrolytic capacitor comprising a solid electrolytic capacitor element, a package covering the element, and an anode terminal and a cathode terminal for electrically connecting to an object;
   wherein the solid electrolytic capacitor element comprises:
   an anode member which is made of a valve action metal and extends in a longitudinal direction of the element, the anode member being provided with an anode portion and an anode lead portion;
   a dielectric layer made of a metal oxide of the valve action metal and formed on a surface of the anode portion; and
   a cathode member comprising a cathode conducting portion formed on a surface of the dielectric layer; and
   wherein the method comprises:
   preparing the solid electrolytic capacitor element;
   applying an insulating resin member to cover the element;
   forming hole portions in the insulating resin member; and
   placing a metal-plating layer in the hole portions to provide the anode terminal and the cathode terminal;
   wherein the applying of the insulating resin member comprises sandwiching the element between resin sheets.

2. A method of fabricating a solid electrolytic capacitor according to claim 1, wherein the resin sheets are hot-pressed or glued to each other by adhesive.

3. A method of fabricating a solid electrolytic capacitor according to claim 1, wherein the applying of the insulating resin member comprises impregnating the element with epoxy resin liquid.

4. A method of fabricating a solid electrolytic capacitor according to claim 1, wherein the placing of the metal-plating layer comprises forming the metal-plating layer so as to protrude from a surface of the insulating resin member.

5. A method of fabricating a solid electrolytic capacitor according to claim 1, wherein the placing of the metal-plating layer comprises forming a solder ball bordered by the metal-plating layer in the hole portions.

6. A method of fabricating a solid electrolytic capacitor according to claim 1, wherein the placing of the metal-plating layer comprises forming a metal foil or plate on a surface of the insulating resin member, wherein the metal foil or plate is electrically connected to the metal-plating layer in the hole portions.

7. A method of fabricating a solid electrolytic capacitor according to claim 1, wherein the forming of the hole portions is executed by a laser process.

8. A method of fabricating a solid electrolytic capacitor according to claim 1, wherein the solid electrolytic capacitor element is a transmission line type;
   wherein said anode terminal includes a first anode terminal and a second anode terminal; and
   wherein said anode lead portion includes a first anode lead portion and a second anode lead portion located on both ends of said anode portion, and said first anode lead portion and said second anode lead portion are connected to said first anode terminal and said second anode terminal, respectively.

* * * * *